US012679478B1

(12) United States Patent　(10) Patent No.:　US 12,679,478 B1

Bourgeois, III　(45) Date of Patent:　Jul. 14, 2026

(54) ANTI-HYDROPLANING AIR REDIRECTION DUCTING SYSTEM FOR VEHICLES

(71) Applicant: Richard M Bourgeois, III, Collins, GA (US)

(72) Inventor: Richard M Bourgeois, III, Collins, GA (US)

( * ) Notice: Subject to any disclaimer, the term of this patent is extended or adjusted under 35 U.S.C. 154(b) by 398 days.

(21) Appl. No.: 18/242,368

(22) Filed: Sep. 5, 2023

Related U.S. Application Data

(60) Provisional application No. 63/454,254, filed on Mar. 23, 2023.

(51) Int. Cl.
B62D 37/02 (2006.01)

(52) U.S. Cl.
CPC ..................................... B62D 37/02 (2013.01)

(58) Field of Classification Search
CPC ................................ B62D 37/02; B62D 35/02
See application file for complete search history.

(56) References Cited

U.S. PATENT DOCUMENTS

| | | | |
|---|---|---|---|
| 5,280,990 A * | 1/1994 | Rinard ................. | B62D 35/001 |
| | | | 296/180.1 |
| 9,994,267 B1 * | 6/2018 | Marmo .................. | B62D 37/02 |
| 2012/0090915 A1 * | 4/2012 | Cheung .............. | F02M 35/1266 |
| | | | 181/224 |
| 2020/0180710 A1 * | 6/2020 | Owen .................... | B62D 65/16 |

FOREIGN PATENT DOCUMENTS

| | | | | |
|---|---|---|---|---|
| EP | 0467523 A2 * | 1/1992 | ............. | B62D 37/02 |
| GB | 2268451 A * | 1/1994 | ............. | B62D 37/02 |
| WO | WO-0136255 A1 * | 5/2001 | ........... | B62D 25/168 |

* cited by examiner

*Primary Examiner* — Lori Lyjak

(74) *Attorney, Agent, or Firm* — Richard Eldredge; Leavitt Eldredge Law Firm

(57) ABSTRACT

An anti-hydroplaning air redirection ducting system for vehicles has an air redirection duct configured to be attached to an underside of a vehicle. The air redirection duct has an airflow catchment with a flared input opening to intake a stream of air received due to forward movement of the vehicle. A tapered conduit connects the catchment to an exhaust output positioned near ground level ahead of one or more wheels of the vehicle, accelerating the received stream of air through the conduit in order to displace water or other fluid from the path of the wheels to prevent hydroplaning.

6 Claims, 2 Drawing Sheets

1

ANTI-HYDROPLANING AIR REDIRECTION DUCTING SYSTEM FOR VEHICLES

BACKGROUND

1. Field of the Invention

The present invention relates generally to vehicles, and more specifically to an anti-hydroplaning system for vehicles.

2. Description of Related Art

Hydroplaning is a common problem experienced while operating a motor vehicle in the rain or other wet conditions where a layer of water builds between the tires of the vehicle and the road surface, causing a loss of friction between the tires and roadway upon which the vehicle depends for traction. This can prevent the vehicle from responding to control inputs such as steering or braking, and can lead to collisions with obstacles, other vehicles, or pedestrians, leading to damage to the vehicle or other property, injury, or even death.

Various mitigation strategies exist for hydroplaning, including proper tire selection, maintaining proper tire pressure and unworn tire tread, electronic stability control systems, and defensive driving techniques. However, although great strides have been made in the area of hydroplaning mitigation systems, many shortcomings remain.

It is therefore the objective of the present invention to provide a ducting system for vehicles which takes advantage of the natural force of air moving around a vehicle in motion, redirecting it toward the roadway in front of a vehicle's tires in order to avoid hydroplaning by displacing the water that would otherwise cause a hydroplaning event.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
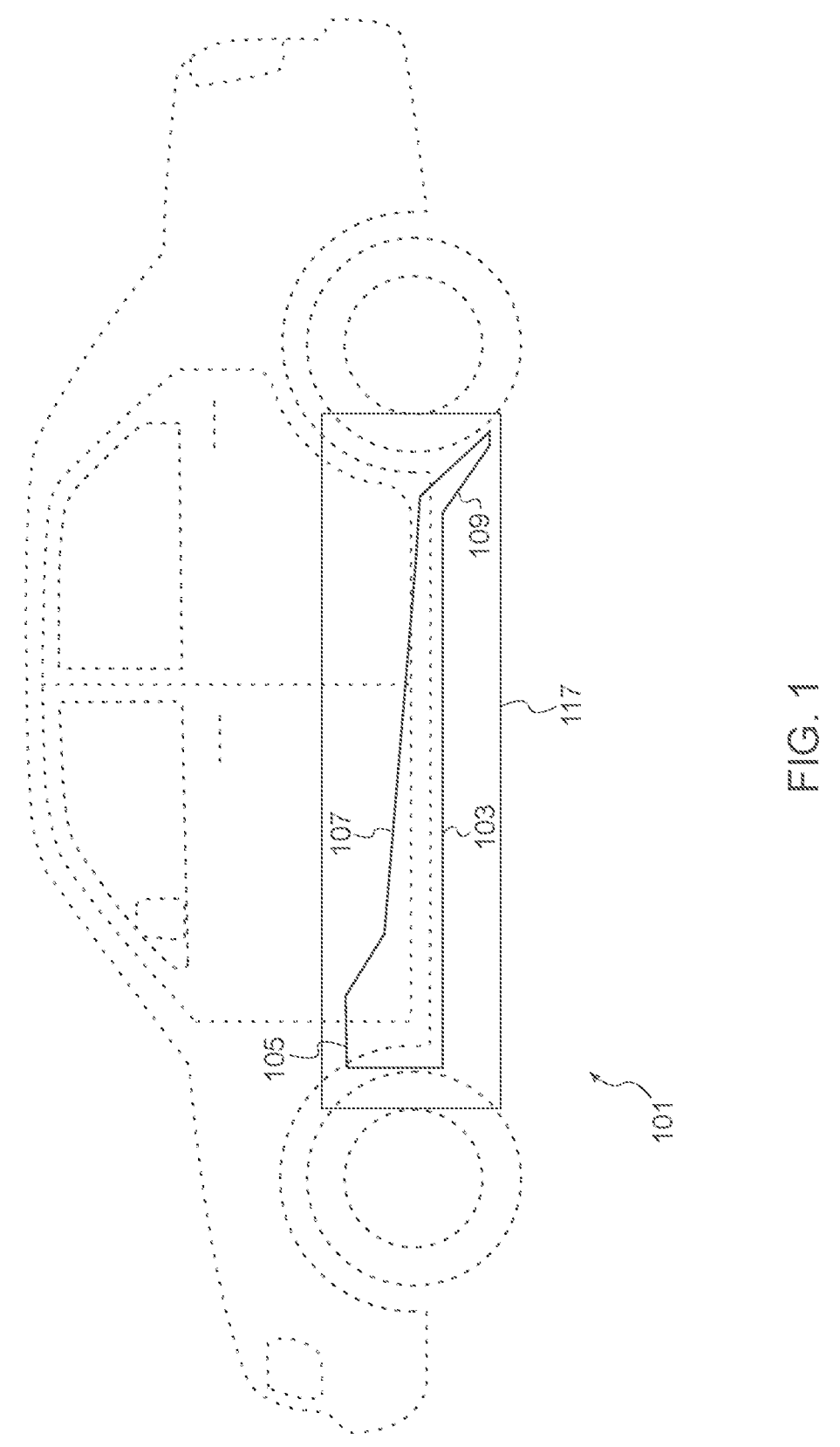
FIG. 1 is a side view illustration of an anti-hydroplaning air redirection ducting system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional anti-hydroplaning systems. Specifically, the system of the present invention captures and redirects airflow incident on the vehicle in motion, accelerating it through a ducting system and outputting it ahead of one or more tires of the vehicle, displacing water that could lead to a hydroplaning event. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
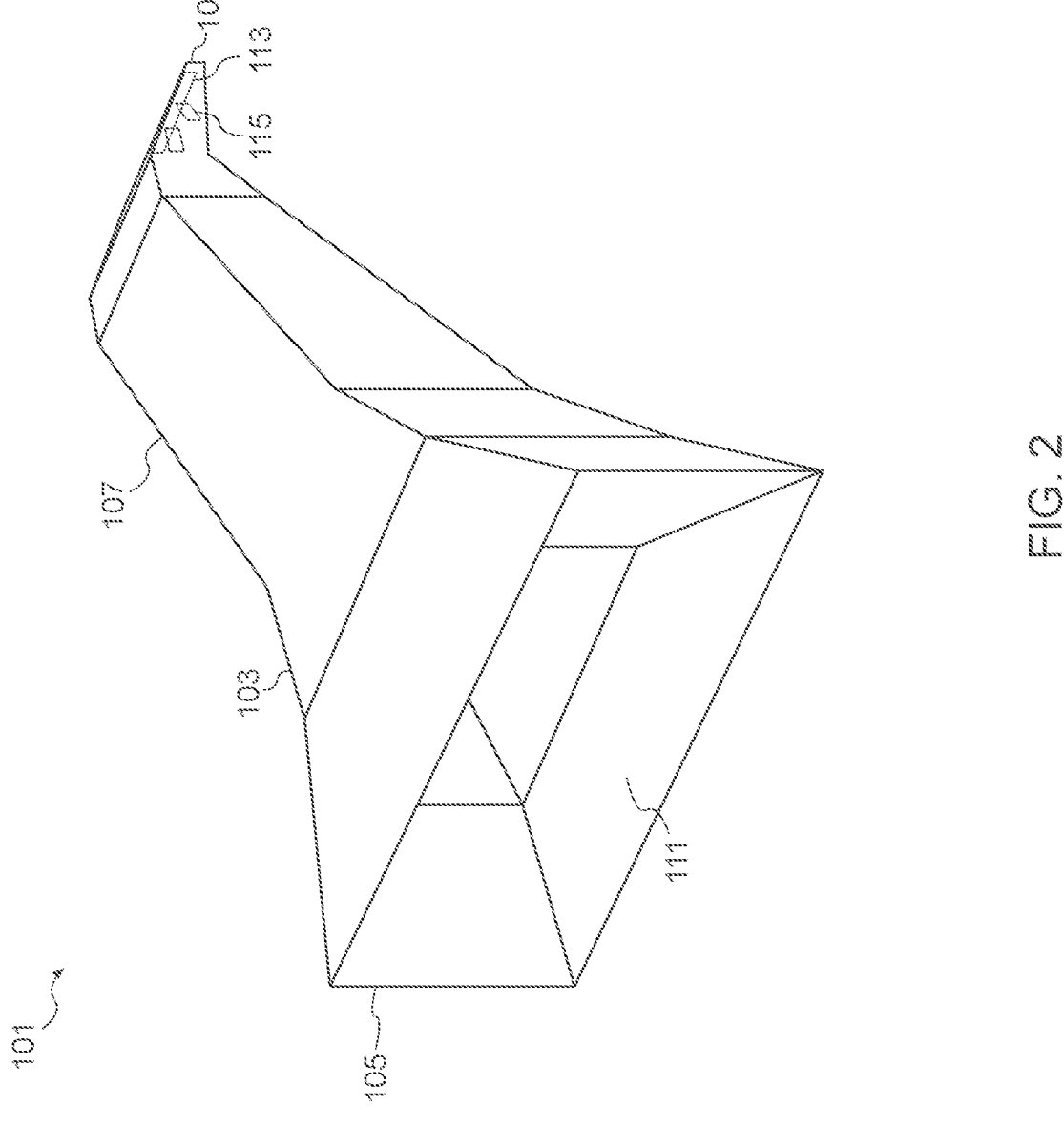
FIG. 2 depicts an exemplary embodiment of an air redirection duct of the system.

Referring now to the drawings wherein like reference characters identify corresponding or similar elements throughout the several views, FIG. 1 illustrates a side view of an anti-hydroplaning air redirection ducting system 101 in accordance with a preferred embodiment of the present application. FIG. 2 depicts an exemplary embodiment of an air redirection duct 103 of the system. It will be appreciated that the anti-hydroplaning air redirection ducting system 101 overcomes one or more of the above-listed problems. In addition, it should be appreciated that more or fewer of such components may be included in different embodiments of the anti-hydroplaning air redirection ducting system 101.

In the contemplated embodiment, the anti-hydroplaning air redirection ducting system 101 includes an air redirection duct 103 configured to be attached to a vehicle. The air redirection duct 103 may be attached to a chassis of the vehicle, to one or more axles, trim, or any other suitable attachment components of the vehicle. One or more mounting means may further be included in the system of the present application, such as, but not limited to, straps, latches, fasteners, and any other suitable mounting means in various embodiments.

The air redirection duct has an airflow catchment 105 configured to intake a stream of air received due to forward motion of the vehicle. The airflow catchment 105 is connected in fluid communication with a tapered conduit 107 configured to transfer and accelerate the stream of air from the airflow catchment 105 to an exhaust output 109 of the air redirection duct 103.

The exhaust output 109 is configured to output the accelerated stream of air adjacent to ground level in order to displace a quantity of water from the path of one or more tires of the vehicle or of a trailer being towed behind the vehicle.

The air catchment comprises a flared input opening 111, while the exhaust output 109 has an output opening 113. The output opening should be substantially smaller than the flared input opening, and the tapered conduit 107 decreases in cross-sectional area from the airflow catchment 105 to the exhaust output 109. This restriction in cross-sectional area of the airstream results in an increase in velocity from the airflow catchment 105 to the output 109, increasing the force applied by the outputted airstream to displace water from the roadway.

It is also contemplated and will be appreciated that the exhaust output 109 should be angled downwards to function as a downspout, such that the output opening 113 is oriented towards the roadway surface. The particular angle of the output opening 113 may vary in different embodiments, as it is contemplated that different angles may produce different effects, and a single herein unspecified angle may be determined to produce the ideally desired effect, or different angles may be found to be particularly suited for different situations.

It is further contemplated that one or more baffles 115 may be incorporated in the present invention. The baffles 115 function to increase the force of air flow from the exhaust output 109 onto the roadway to enhance the water displacing capability of the present invention. The baffles 115 may be positioned, oriented and connected in any manner within the duct 103 suitable to accomplishing this purpose.

It is further contemplated that the system 101 of the present invention may include a wind skirt 117. The wind skirt 117 may be connected to the vehicle chassis, adjacent to and laterally outside the vehicle's wheels. The wind skirt 117 functions to prevent incident wind or other effects from interfering with the desired airflow into or out of the duct 103. The wind skirt 103 retains the accelerated output stream of air adjacent to the wheels.

The particular embodiments disclosed above are illustrative only, as the embodiments may be modified and practiced in different but equivalent manners apparent to those skilled in the art having the benefit of the teachings herein.

It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An anti-hydroplaning air redirection ducting system for vehicles comprising:
    an air redirection duct configured to be attached to a vehicle;
    the air redirection duct having;
        an airflow catchment configured to capture a stream of air received due to forward movement of the vehicle;
        a tapered conduit integral with the airflow catchment and configured to transfer and accelerate the stream of air from the airflow catchment to an exhaust output section, wherein the exhaust output section is configured to direct the stream of air to a position toward a ground surface infront of a rear wheel of the vehicle in order to displace fluid on a surface the vehicle is traveling thereon; and
        a plurality of baffles disposed within an area formed by the exhaust output section, the plurality of baffles compress the stream of air traveling through the tapered conduit.

2. The anti-hydroplaning air redirection ducting system for vehicles of claim 1, wherein the airflow catchment comprises a flared input opening.

3. The anti-hydroplaning air redirection ducting system for vehicles of claim 1, wherein the tapered conduit decreases in cross-sectional area from the airflow catchment to the exhaust output.

4. The anti-hydroplaning air redirection ducting system for vehicles of claim 1, wherein the exhaust output comprises an output opening.

5. The anti-hydroplaning air redirection ducting system for vehicles of claim 4, wherein the output opening is smaller than the flared input opening.

6. The anti-hydroplaning air redirection ducting system for vehicles of claim 1, further comprising:
    a wind skirt connected to the vehicle chassis, adjacent to and laterally outside the vehicle's wheels, wherein the wind skirt retains the accelerated output stream of air adjacent to the wheels.

\* \* \* \* \*